(12) United States Patent
Breier

(10) Patent No.: US 6,290,042 B1
(45) Date of Patent: Sep. 18, 2001

(54) LOCKUP CLUTCH FOR A TORQUE CONVERTER

(75) Inventor: Horst Breier, Dittelbrunn (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/488,131

(22) Filed: Jan. 20, 2000

(30) Foreign Application Priority Data

Jan. 21, 1999 (DE) .............................................. 199 02 191

(51) Int. Cl.$^7$ .................................................. F16H 45/02
(52) U.S. Cl. .......................... 192/3.29; 192/205; 192/212
(58) Field of Search ................... 192/3.29, 3.28, 192/205, 212; 464/67

(56) References Cited

U.S. PATENT DOCUMENTS

| 5,209,330 | * | 5/1993 | Macdonald | 192/3.29 |
| 5,769,195 | * | 6/1998 | Fukushima | 192/3.29 |
| 5,772,515 | * | 6/1998 | Yamakawa et al. | 464/67 |
| 5,964,328 | * | 10/1999 | Fallu et al. | 192/3.29 |

FOREIGN PATENT DOCUMENTS 197 21 642   7/1998 (DE) ................................. F16D/3/14

\* cited by examiner

*Primary Examiner*—Rodney H Bonck
(74) *Attorney, Agent, or Firm*—Cohen, Pontani, Lieberman & Pavane

(57) ABSTRACT

A lockup clutch for a torque converter has an axially displaceable piston for transmitting a torque from the drive side to the driven side of the torque converter. The piston is connected with a turbine wheel via a torsional vibration damper. The torsional vibration damper has an input part connected with the piston so that the input part is fixed with respect to rotation relative to the piston and an output part connected with the turbine wheel so that the output part is fixed with respect to rotation relative to the turbine wheel. The torsional vibration damper also has a plurality of torsional damper springs arranged between the input part and the output part and distributed along a circumference of the torque converter so that the input part is rotatable relative to the output part along a determined angular area. Each torsional damper spring has an individual cover plate connected directly with the turbine wheel and an axial securing device arranged for fixing the torsional damper springs in their axial position.

8 Claims, 4 Drawing Sheets

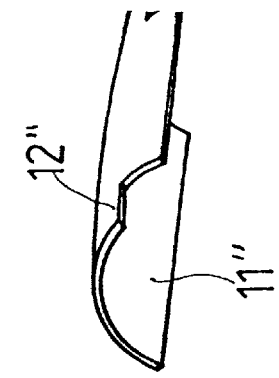
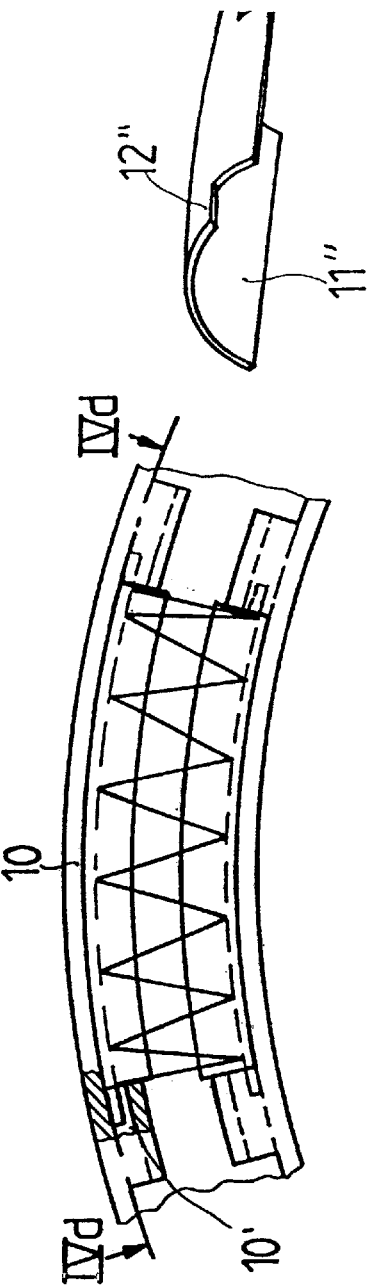
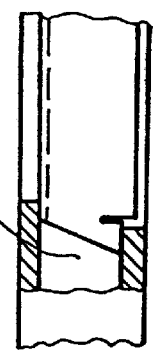
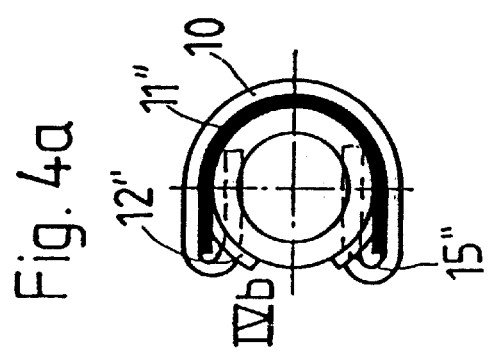

LOCKUP CLUTCH FOR A TORQUE CONVERTER

BACKGROUND OF THE INVENTION

1. Field of the Invention

The present invention relates to a lockup clutch for a torque converter with an axially displaceable piston for transmitting a torque from a drive side to a driven side of the torque converter. The piston is connected to a turbine wheel of the torque converter via a torsional vibration damper. The torsional vibration damper has an input part which is connected with the piston so as to be fixed with respect to rotation relative to it and an output part which is connected with the turbine wheel so as to be fixed with respect to rotation relative to it. A plurality of torsional damper springs are arranged between the input part and the output part distributed along the circumference of the torque converter such that a relative rotation is possible between the input part and the output part along a determined angular area. The torsional vibration damper has an individual cover plate connected directly with the turbine wheel having an axial securing device for the torsional damper springs.

2. Description of the Related Art

A prior art torque converter having a lockup clutch with a torsional vibration damper arranged between the piston of the lock up clutch and the turbine wheel of the torque converter is known, for example, from DE 197 21 642 C1. This torque converter is constructed so as to be quite narrow in the axial direction because only one cover plate is provided for the lockup clutch. The torsional vibration damper has an input part which is connected with the piston so as to be fixed with respect to rotation relative to it and an output part which is connected with the turbine wheel so as to be fixed with respect to rotation relative to it. A plurality of torsional damper springs are arranged between the input part and the output part distributed along the circumference of the torque converter such that a relative rotation is possible between the input part and the output part along a determined angular area. The input part of the torsional vibration damper contacts one end of a damper spring of the torsional vibration damper by its control edge and the output part contacts the other end of the damper spring by its control edge. During a relative rotation of the input part and output part the torsional damper springs are compressed, thereby damping torsional vibrations. Holding cams are provided for the axial securing of the torsional damper springs. However, the springs can bulge out in the axial direction when acted upon by force and contact the piston. The contact leads to wear of the piston during torsional vibrations.

SUMMARY OF THE INVENTION

It is the object of the invention to a torque converter with a lockup clutch including a torsional vibration damper arranged between the piston of the lockup clutch and the turbine wheel of the torque converter such that the spring of the torsional vibration damper does not bulge out in an axial direction and contact the piston without increasing the axial space requirement of the torque converter.

This object is met in that the lockup clutch mentioned above includes devices for fixing the torsional damper springs in their axial position arranged around the circumferential direction of the torsional vibration springs.

Every torsional damper spring is accordingly guided along its entire length, so that bulging is impossible and knocking against the piston is prevented.

The device is preferably formed by at least one plate which engages around the torsional damper springs along more than one half of the circumference and which is installed in the driven part. In this way, guiding of the damping springs is realized particularly economically.

The device may comprise two plates which respectively engage around the torsional damper springs on the radial outer side and radial inner side and accordingly act as half-shells. Furthermore, collars or clips which snap into recesses in the driven part are provided for fastening the device to the torsional vibration damper.

The device may also comprise one plate bent in a U-shaped manner viewed in cross section, so that the one plate covers the torsional damper springs on the radial outer side and the radial inner side and on the side facing the driven part.

To manufacture the cover plate from a simple material, the device may comprise a plate or plates produced from wear-resistant and/or heat-treated material.

In a further embodiment, the device is formed with an axial bevel on at least one of the contact faces for the ends of the torsional damper springs on the input part and/or the output part of the cover plate.

The axial bevel causes the torsional damper springs to be pretensioned and deflected by the oblique introduction of force in the side remote of the piston. That is, the axial bevel introduces a pretensioning force that urges the spring to bulge in a direction facing away from the piston. In the embodiment having two bevels, the two bevels are preferably constructed so as to run in opposite directions axially.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 2c is a perspective view of a coverplate from the torsional vibration damper of FIG. 2a;

FIG. 3c is a perspective view of a coverplate from the torsional vibration damper of FIG. 3a;

FIG. 4a is a sectional view of yet another embodiment of a torsional vibration damper from the lockup clutch in a torque converter shown in FIG. 1;

FIG. 4b shows the torsional vibration damper of FIG. 4a from the view according to arrow IVb;

FIG. 4c is a perspective view of a coverplate from the torsional vibration damper of FIG. 4a;

FIG. 4d is a partial sectional view of the torsional vibration damper shown in FIG. 4b along the line IVd–IVd.

DETAILED DESCRIPTION OF THE PRESENTLY PREFERRED EMBODIMENTS

Figure 1:
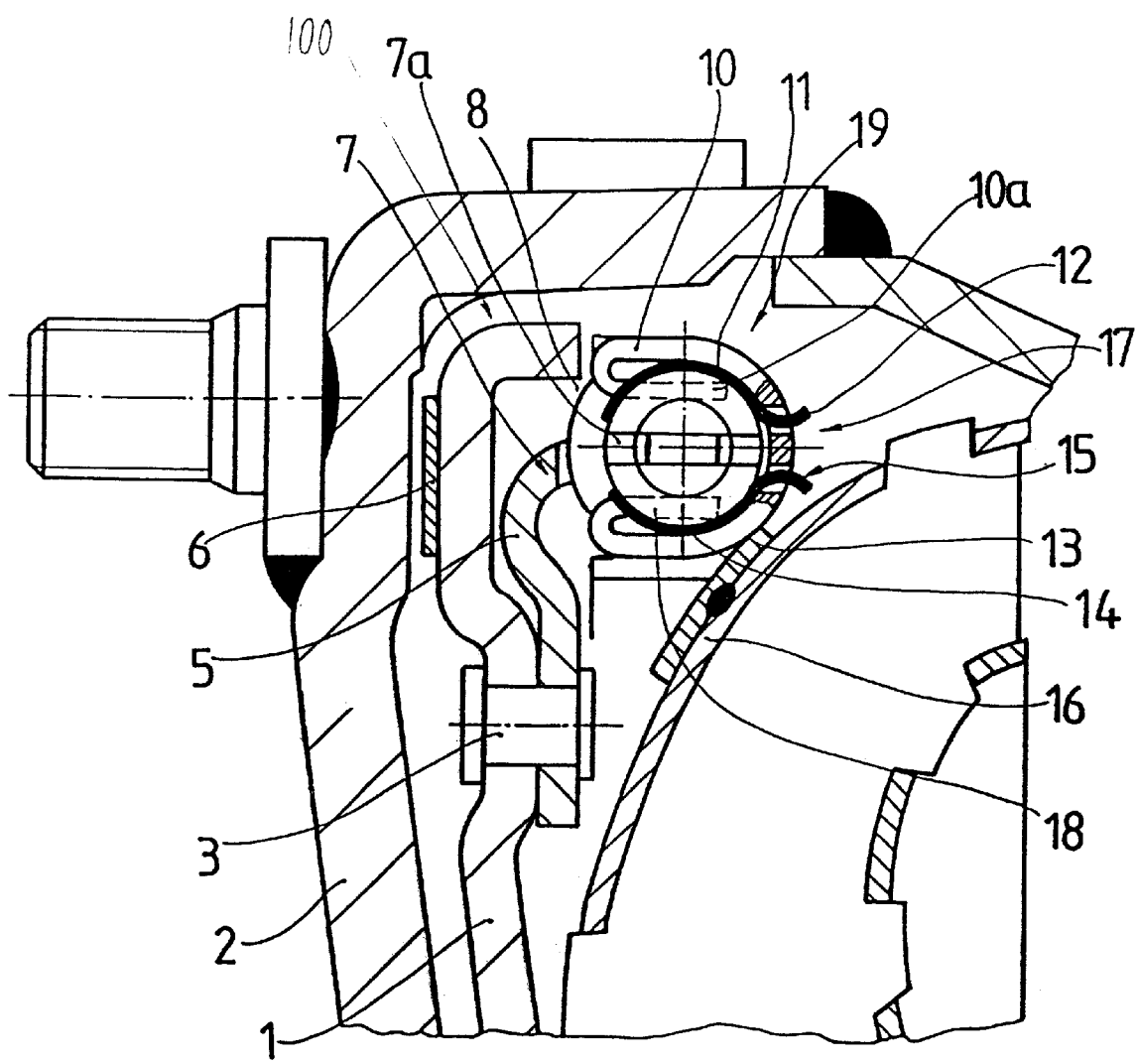
FIG. 1 is a sectional view of a radial outer portion of a lockup clutch in a torque converter according to an embodiment of the present invention.

A lockup clutch 100 with a torsional vibration damper 17 according to an embodiment of the present invention is shown in FIG. 1 and is formed by an axially displaceable piston 1, an input part 7, and an output part 19. The input part 7 is connected to the piston 1 by a rivet 3 so that the input part 7 is fixed with respect to rotation relative to the axially displaceable piston 1. The output part 19 is formed by an individual cover plate 10 and connected (for example, welded) with the turbine wheel 16 by a formed-on portion 13 so that the output part 19 is fixed with respect to rotation relative to the turbine wheel 16. A friction facing 6 is arranged at a radially outer area of the piston 1. When the piston 1 is displaced toward a converter housing 2 of the torque converter, the friction facing 6 contacts the converter housing 2 so that torque may be transmitted directly from the converter housing 2 to the turbine wheel 16. The torsional vibration damper 17 further comprises torsional damper springs 18 inserted in windows, not shown, in the cover plate 10 and are distributed about a circumference of the torque converter. The input part 7 comprises a portion of a hub disk 5 that is arranged at one end of the torsional damper springs 18. The input part 7 comprises a plurality of axial angles 7 facing the torsional damper springs 18 and serve as control edges. Angles 10a of the cover plate 10 contact the other end of the torsional damper springs 18.

As is shown in FIG. 1, the cover plate 10 is bent such that it has a substantially U-shaped cross-section. A radial outer plate 11 is arranged between a radial outer side of the torsional damper spring 18 and the cover plate 10 and a radial inner plate 14 is arranged between a radial inner side of the torsional damper spring 18 and the cover plate 10. The plates 11, 14 are respectively connected with the cover plate 10 via clips 12, 15.

Figure 2C:
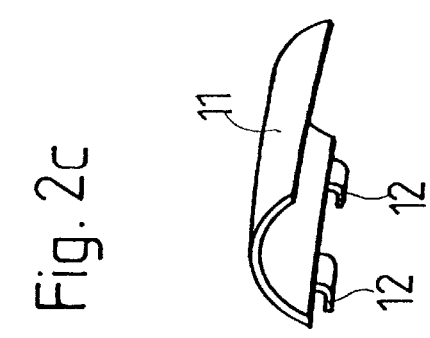
Figure 2B:
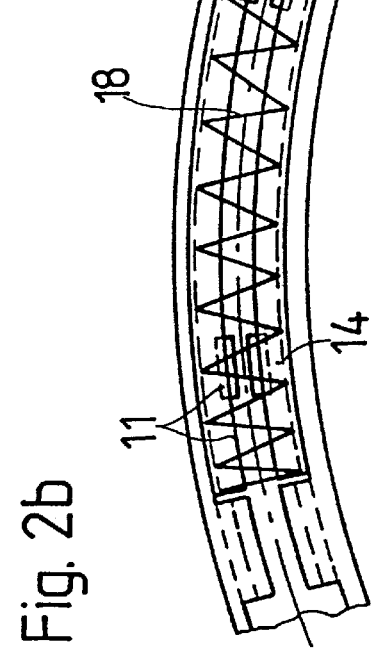
FIG. 2b shows the torsional vibration damper of FIG. 2a from the view according to arrow IIb.
Figure 2A:
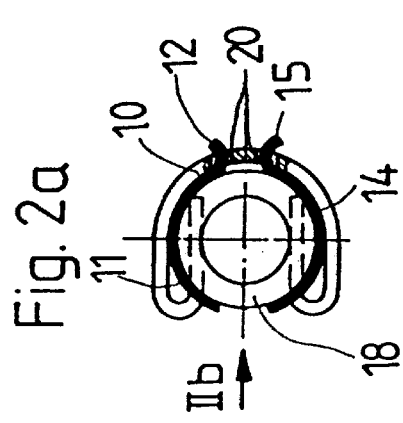
FIG. 2a is a sectional view of a torsional vibration damper from the lockup clutch in the torque converter shown in FIG. 1.

The construction of the plates 11, 14 is shown more clearly in FIGS. 2a to 2c. The plates 11, 14 are bent such that they press closely against the outer circumference of the torsional damper springs 18 and engage around over more than one half of the outer circumference of the torsional damper springs 18. The axial clips 12, 15 of the plates 11, 14 are inserted in recesses 20 in the cover plate 10. The shell-shaped plates 11, 14 are arranged so that they snap into place in the cover plate 10. Instead of snapping into place, the clips 12, 15 may also be bent for the purpose of fastening the shell-shaped plates 11, 14 in place after insertion. Due to the fact that the plates 11, 14 engage around the torsional damper springs 18 along their full length on the side facing the piston 1 as well as on the radial outer side and radial inner side, the torsional damper springs 18 are prevented from bulging out axially during relative rotation between the input part 7 and the output part 19. Consequently, the spring 18 are prevented from bulging toward the piston 1 and therefore do not touch the piston so that no wear occurs on the piston 1 due to the axial bulging of the springs 18.

Figure 3C:
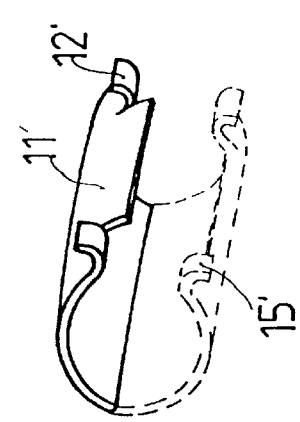
Figure 3B:
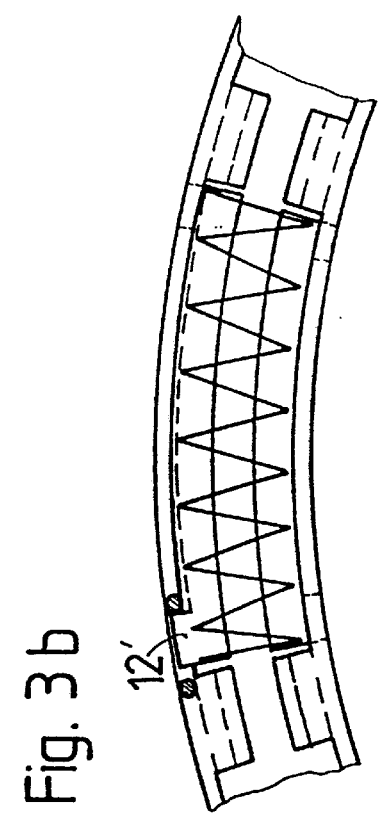
FIG. 3b shows the torsional vibration damper of FIG. 3a from the view according to arrow IIIb.
Figure 3A:
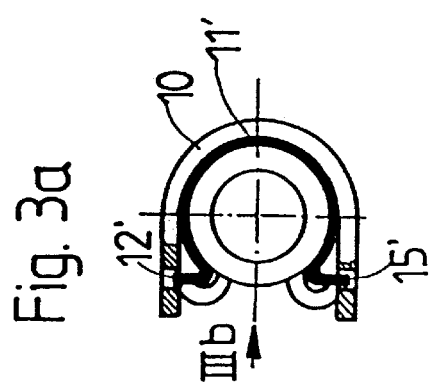
FIG. 3a is a sectional view of another embodiment of a torsional vibration damper from the lockup clutch in a torque converter shown in FIG. 1.

FIGS. 3a to 3c show another embodiment according to the present invention including a one-piece plate 11'. The plate 11' is bent in a U-shaped cross-section and clips 12' and 15' are respectively provided at the two outer sides of its free legs. The clips 12', 15' are arranged so that they can snap into recesses 20 in the cover plate 10. This plate 11' may alternatively be constructed as a two-part plate.

FIGS. 4a to 4d show another embodiment of the plate 11" according to the present invention. In this case, the plate 11" which is bent in a U-shaped cross-section snaps into the cover plate 10 with bent clips 12", 15". In principle, the plate 11" may be constructed in one or two parts. As shown in FIG. 4d, the outer edges of the clips 12" are beveled and engage a recess 10' in the cover plate 10.

Figure 5:
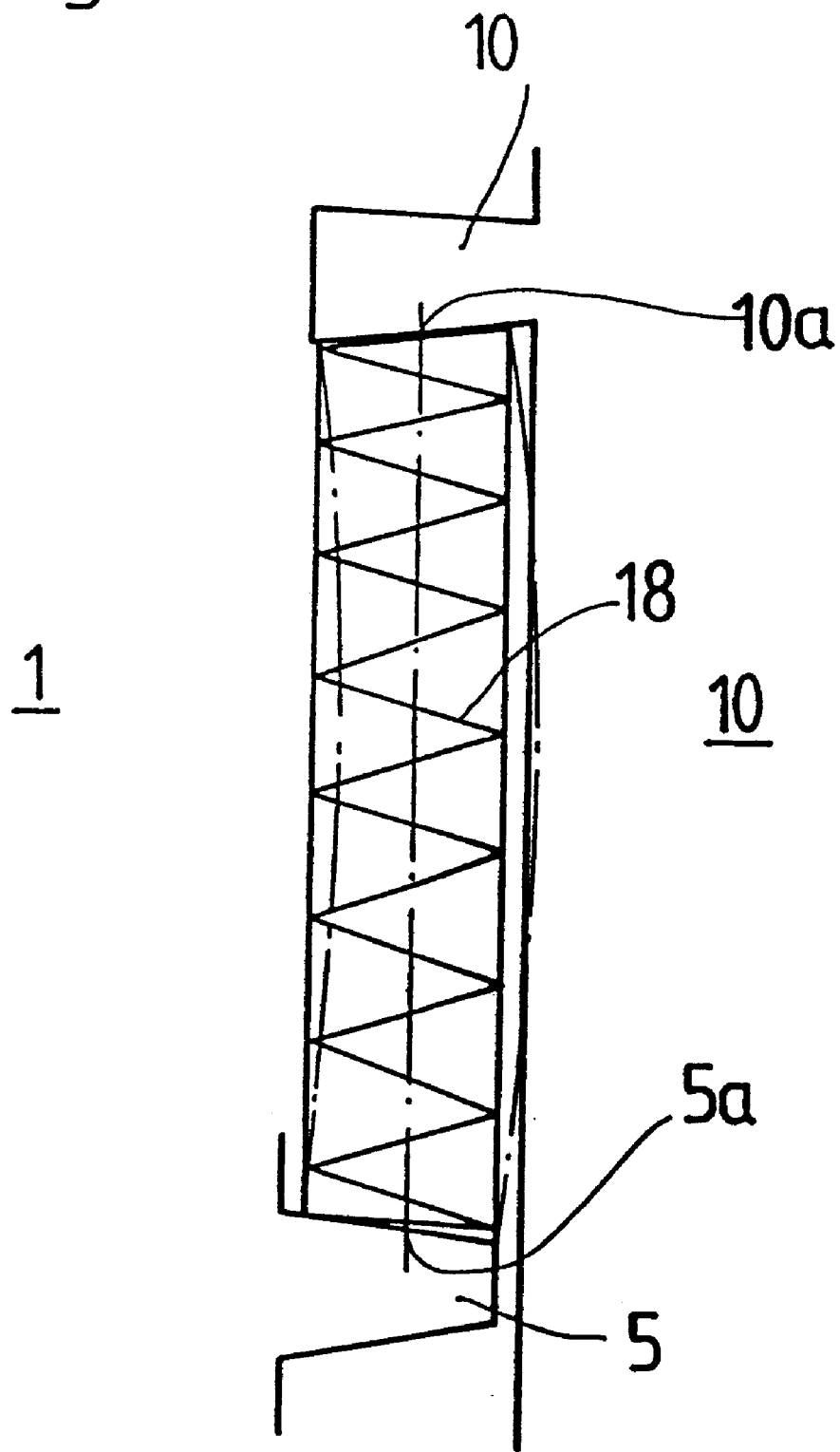
FIG. 5 is a schematic view of a further embodiment of a torsional vibration damper according to the present invention.

FIG. 5 shows another device according to the present invention for preventing the torsional damper springs 18 from being deflected toward the piston 1. A control edge 5a of the hub disk 5 and the control edge 10a of the cover plate 10, which contact the respective ends of the torsional damper springs 18, are beveled in opposite directions. That is, the distance from one another is smaller at the side facing the piston 1 than at the side remote of the piston 1. The torsional damper springs 18 are accordingly pretensioned. Due to the oblique introduction of force, they are compelled to bulge out on the side remote of the piston 1. However, the closed side of the cover plate 10 is located on the side of the springs 18 remote from the piston 1. Accordingly, the torsional damper spring 18 immediately comes into contact with the cover plate 10 and is guided along its full length so that bulging is prevented.

The invention is not limited by the embodiments described above which are presented as examples only but can be modified in various ways within the scope of protection defined by the appended patent claims.

I claim:

1. In a torque converter having a driven side including a turbine wheel and a drive side including a converter cover and an impeller wheel, a lockup clutch comprising:

an axially displaceable piston rotatably fixed to the driven side of the torque converter and axially displaceable toward the converter housing of the torque converter for transmitting a torque from the drive side to the driven side;

a torsional vibration damper having an input part connected to said piston, an output part connected to the turbine wheel of the torque converter, and a torsional damper spring arranged between said input part and said output part so that said input part is rotatable relative to said output part against the urgency of said torsional damper spring; and said torsional vibration damper comprising a coverplate connected to the turbine wheel and an axial securing device extending along a circumference of said torsional damper spring and operatively arranged for preventing the axial movement of said torsional damper spring toward said piston, wherein said axial securing device comprises at least one plate that engages around more than one half of the circumference of said torsional damper spring and said axial securing device is installed in said output part of said torsional vibration damper.

2. The lockup clutch of claim 1, wherein said at least one plate of said axial securing device comprises two plates that respectively engage around a radial outer side and a radial inner side of said torsional damper spring.

3. The lockup clutch of claim 1, wherein said at least one plate comprises formed-on clips that are insertable into recesses in the output part of said torsional vibration damper so that said clips snap into said recesses.

4. The lockup clutch of claim 3, said at least one plate comprises formed-on clips that are insertable into recesses in the output part of said torsional vibration damper and are bendable for fixedly connecting said at least one plate to said coverplate after the clips are inserted in said recesses.

5. The lockup clutch of claim 1, wherein said at least one plate comprises a plate that is bent into a form having a U-shaped cross section.

6. The lockup clutch of claim 1, wherein said at least one plate comprises a material consisting of one of a wear-resistant material and a heat-treated material.

7. In a torque converter having a driven side including a turbine wheel and a drive side including a converter cover and an impeller wheel, a lockup clutch comprising:

an axially displaceable piston rotatably fixed to the driven side of the torque converter and axially displaceable toward the converter housing of the torque converter for transmitting a torque from the drive side to the driven side;

a torsional vibration damper having an input part connected to said piston, an output part connected to the turbine wheel of the torque converter, and a torsional damper spring arranged between said input part and said output part so that said input part is rotatable relative to said output part against the urgency of said torsional damper spring; and said torsional vibration damper comprising a coverplate connected to the turbine wheel and an axial securing device extending along a circumference of said torsional damper spring and operatively arranged for preventing the axial movement of said torsional damper spring toward said piston, wherein said input part comprises an input contact face abutting an end of said torsional damper spring and said output part comprises an output contact face abutting another end of said torsional damper spring, and said axial securing device comprises an axial bevel on one of said input contact face and said output contact face.

8. The lockup clutch of claim 7, wherein said axial securing device comprises axial bevels on each of said input contact face and said output contact face, said axial bevels constructed to run in opposite directions axially such that their distance from one another is smaller on a first axial side facing said piston than on a second axial side facing said output part.

* * * * *